T. B. STEVENSON.
BOLL WEEVIL TRAP.
APPLICATION FILED OCT. 7, 1918.
1,331,946.
Patented Feb. 24, 1920.
2 SHEETS—SHEET 1.
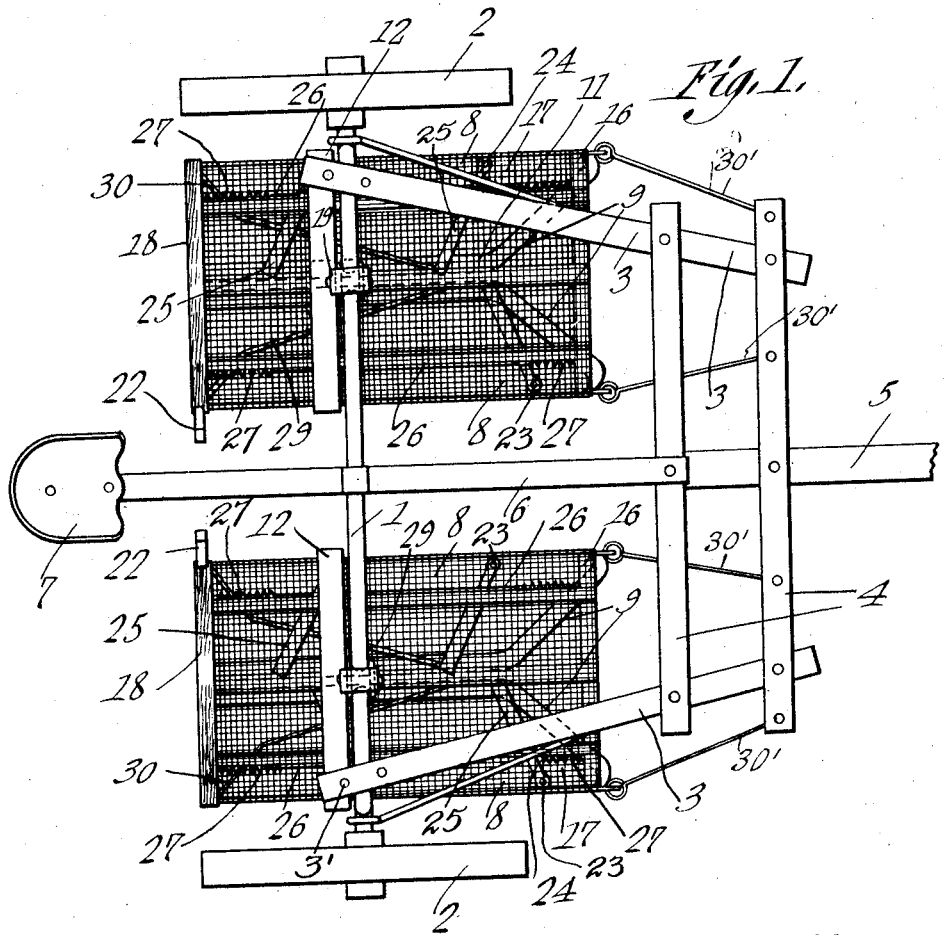
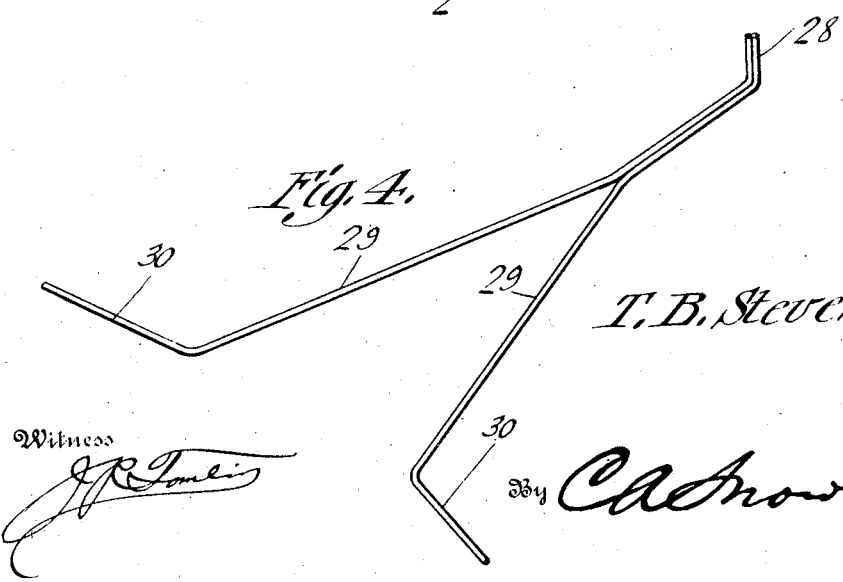

T. B. STEVENSON.
BOLL WEEVIL TRAP.
APPLICATION FILED OCT. 7, 1918.
1,331,946.
Patented Feb. 24, 1920.
2 SHEETS—SHEET 2.
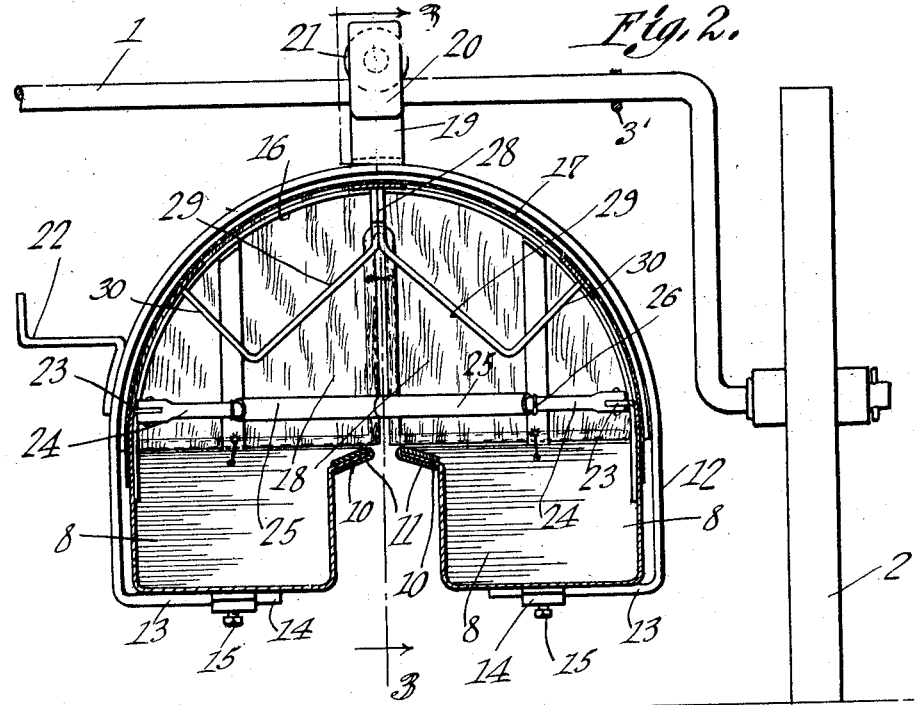
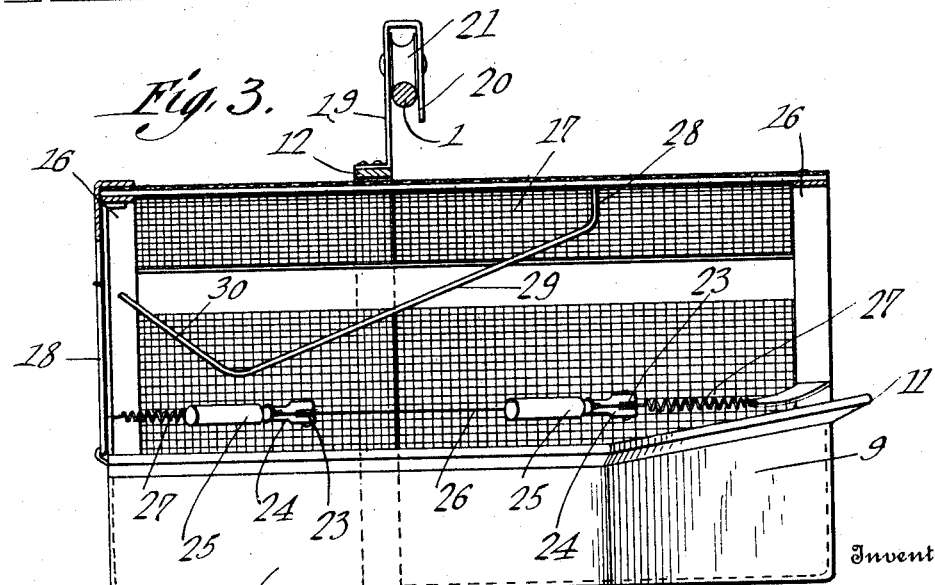
Witness
Inventor
T. B. Stevenson
By C. A. Snow & Co.
Attorneys

UNITED STATES PATENT OFFICE.

TUREN BROWN STEVENSON, OF McRAE, GEORGIA.

BOLL-WEEVIL TRAP.

1,331,946.   Specification of Letters Patent.   Patented Feb. 24, 1920.

Application filed October 7, 1918. Serial No. 257,208.

*To all whom it may concern:*

Be it known that I, TUREN BROWN STEVENSON, a citizen of the United States, residing at McRae, in the county of Telfair and State of Georgia, have invented a new and useful Boll-Weevil Trap, of which the following is a specification.

This invention relates to boll weevil traps, one of its objects being to provide a machine adapted to straddle two rows of cotton plants, there being means coöperating with the plants of each row for knocking the insects and the perforated squares from the plants and into a receiver containing an inflammable fluid or other insect destroying means.

Another object is to provide means under the constant control of the driver whereby the plant agitating means and the insect receivers can be lifted laterally thus to be held in proper relation to the rows of plants.

A further object is to provide improved means for mounting the traps on the running gear of the machine.

With the foregoing and other objects in view, the invention consists of certain novel details of construction and combination of parts which will be more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In the drawings:—

Figure 1 is a plan view of the machine.

Fig. 2 is a vertical transverse section through the rear portion of one of the traps.

Fig. 3 is a section on line 3—3 of Fig. 2.

Fig. 4 is a detail view of one of the plant spreaders.

Referring to the figures by characters of reference 1 designates an arched axle having supporting wheels 2 and secured on this axle U-bolts 3' or the like are hounds 3 secured at their forward ends to cross beams 4 from which extends a draft tongue 5. A spring strip 6 is secured to one of the beams 4 and bears on the axle 1 from which it extends upwardly and rearwardly so as to support a seat 7.

Arranged under the arched axle 1 at each side of the center thereof is a trap adapted to straddle and to travel along one row of cotton plants and as both traps are of the same construction, a description of one will apply to both.

Each trap comprises two pans each spaced apart along their inner walls so as to receive plants between them, the inner walls diverging forwardly at their front ends as indicated at 9, thus to constitute gathering means. A flange extends upwardly and outwardly from the upper edge of the inner wall of the flange, as shown at 10 and is provided with a covering 11 of rubber or other soft material which will not injure the plant against which it rubs.

Arched supporting strips 12 extend over the central portions of the two pans and the lower ends are inturned as at 13 so as to extend under the respective pans, said ends being slidably mounted in a guide bracket 14 under each pan and each bracket being provided with a set screw 15. Thus it will be seen that the pans can be adjusted toward or from each other along the inturned portion 13 and can be held by tightening the screws 15.

Additional strips 16 which are arched, are connected to the outer sides of the two pans and fastened to them is a wire netting 17 or the like which extends over the pans and extends throughout the length thereof. The trap is open at its front end but its rear end is partly closed by segmental curtains 18 the lower edges of which can be fastened in any manner desired to the rear walls of the pans 8.

Hangers 19 are connected to the central portions of the bands or strips 12 of the two traps, each of these hangers having a hook-like portion 20 at its upper end within which is journaled a grooved wheel 21 resting on the arched axle 1. A foot rest 22 is extended inwardly from the inner side of the rear strip 26 of each trap and is located at a point where it can be conveniently reached and operated from the seat 7.

Brackets 23 are extended inwardly from the upper portions of the outer sides of the pans 8 and to each of these brackets is pivotally connected an agitating arm 24 which is covered with rubber or other soft material indicated at 25. The arms 24 above each pan are connected by a wire 26 or the like and springs 27 connect the front and rear end portions of the pans to the adjacent arms 24. These springs serve to hold the arms 24 yieldingly in predetermined positions, all of the arms extending a short distance across the space between the flanges 10 of the opposed pans 8.

For the purpose of spreading the plants within the trap so as to bring the branches over the pans 8, a spreading rod which is shown in detail in Fig. 4 is employed. This rod has a stem 28 fastened to the front portion of the top of the trap at the center thereof and extending rearwardly to rearwardly diverging arms 29 which overhang the pans 8 and terminate in fingers 30 extending laterally and attached to the sides of the trap over the rear portions of the pans. Thus it will be seen that as the machine moves forwardly with the two traps straddling the respective rows, the plants will be received between the flanges 10 and the branches of the plants will be spread laterally so as to overhang the pans 8. While thus held the agitating arms 24 will slip along the plants and agitate them to such an extent as to dislodge the insects and the perforated squares so that they will fall into the pans 8 and into the liquid contained therein. Coaloil or other fluid can be employed as the insecticide. The driver rests his feet on the parts 22 and by pulling or pushing on said parts the traps can be moved toward or from each other so as to remain in proper relation to the rows. The curtains 18 prevent any of the insects or the perforated squares from falling rearwardly out of the trap. The trap can be maintained in proper position relative to the running gear of the machine by providing rods 30' extending from the sides of the trap at the front ends thereof to one of the cross beams 4.

Having thus described the invention, what is claimed is:—

1. In a machine of the class described the combination with a wheel supported arched axle, of hangers mounted for free movement along the axle, a trap supported by each hanger, a seat supported back of the axle, and a foot rest upon the inner side of each trap for engagement by the occupant of the seat to shift the traps freely along the axle toward and from each other.

2. In a machine of the class described the combination with a wheel supported structure and arched supporting means carried thereby and having inturned ends, of spaced parallel pans mounted on said ends and slidable toward and from each other, horizontally movable arms above each of the pans and extending across the space between the pans, the arms above each pan being parallel, a connection between the arms above each pan, spring means for holding the arms normally in position across the space between the pans, and a rigid plant spreading means supported above the pans.

In testimony that I claim the foregoing as my own, I have hereto affixed my signature in the presence of two witnesses.

TUREN BROWN STEVENSON.

Witnesses:
 E. F. McRae,
 A. V. Whiddow.